United States Patent Office 3,518,534
Patented June 30, 1970

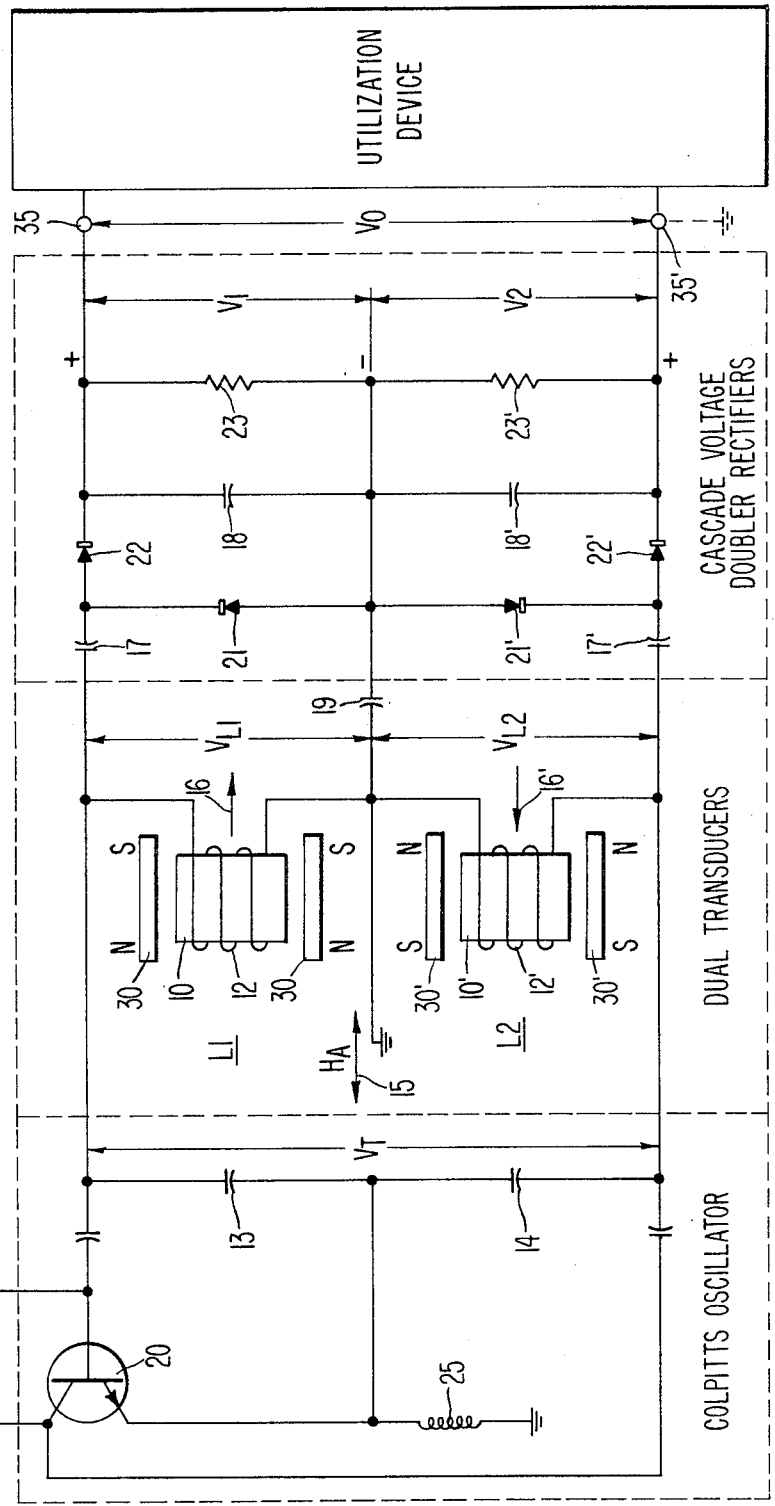
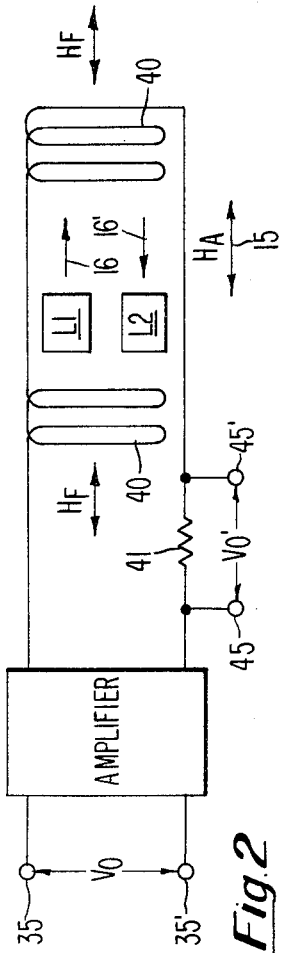
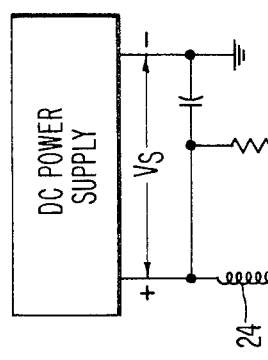
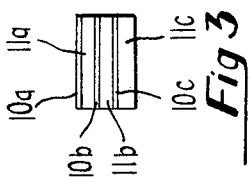
INVENTOR.
CLIFFORD J. BADER

3,518,534
MAGNETOMETER EMPLOYING DUAL THIN MAGNETIC FILM TRANSDUCERS
Clifford J. Bader, West Chester, Pa., assignor to Burroughs Corporation, Detroit, Mich., a corporation of Michigan
Filed Dec. 19, 1967, Ser. No. 691,901
Int. Cl. G01r *33/02*
U.S. Cl. 324—43                                    13 Claims

ABSTRACT OF THE DISCLOSURE

The present disclosure describes a magnetometer or magnetic field sensing device which utilizes a self-controlled oscillator for generating a constant radio frequency voltage, a pair of thin magnetic film transducers sensitive to the magnetic fields applied thereto, and circuits for providing an output signal varying in amplitude and polarity in response to said applied magnetic fields.

CROSS REFERENCES TO RELATED APPLICATIONS

The basic thin magnetic film inductance variation mode of magnetometer transducer action has been described and claimed in copending application for U.S. Pat., Ser. No. 449,183, entitled "Magnetometer," filed Apr. 19, 1965, now Pat. No. 3,146,072, in the names of Richard L. Fussell and Clifford J. Bader and assigned to the same assignee as the present application. In this copending application, it was disclosed that a simple, low power, sensitive, magnetic field sensing device could be realized by exploiting the dependence of the thin film permeability in a "hard" direction transverse to the "easy" or preferred axis of magnetization of the film, on a magnetic field component, directed along the film's preferred or "easy" axis. Moreover, it was taught that measure of an ambient field could be accomplished by using the thin film inductance as part of a resonant tank circuit in conjunction with circuits which produce an output proportional to changes in the resonant frequency of the tank.

In another copending application for U.S. Pat., Ser. No. 543,097, entitled "Magnetometer System," filed Apr. 18, 1966, in the names of Clifford J. Bader, Richard L. Fussell, and Arthur G. Barnett, assigned to the same assignee as the present application, there is taught and claimed a magnetometer system comprising a thin film transducer tank circuit employed as a slope-detection filter and excited from a constant frequency source.

SUMMARY OF THE INVENTION

The slope-detection thin film magnetometer described and claimed in copending application Ser. No. 543,097 referenced hereinbefore, entitled "Magnetometer System" has been shown to be a practical device. Nevertheless it utilizes a fragile quartz crystal for frequency control in the radio frequency oscillator, and the augmentation of sensitivity by incorporation of thin magnetic film transducer into a high Q tuned circuit also increases the effects of inductance and capacitance drifts on sensitivity and output signal voltage. In fact, negative temperature coefficient capacitance padding must be employed for wide temperature operation, and components must be chosen for long term stability if the need for periodic retuning is to be avoided.

The magnetometer of the present invention eliminates both the crystal and the tuning capacitors of the slope-detection device and is therefore especially suited for applications requiring extreme ruggedness and long term untended operation.

In the present circuit, parameter drifts tend to balance out and no compensation is needed. Additionally, no initial or periodic adjustments of the device are necessary. Another most important consideration is that while the magnetometer employs a self-controlled oscillator, the precise frequency of oscillation is immaterial in that it is not a factor in determining the output signal level.

In order to accomplish these results, the present invention utilizes a pair of thin magnetic film transducers, physically arranged so that they have a common easy or sensitive axis and are magnetically biased to opposite states of residual flux density along said axis. The transducers are electrically connected across a source of constant radio frequency (RF) voltage. The RF voltages appearing across each of the transducers in response to a magnetic field applied concurrently thereto, are combined in detector circuits which produce the desired DC output signal indicative of the direction and strength of the applied field.

BRIEF DESCRIPTION OF THE DRAWING

FIG. 1 is a semischematic representation of an operative embodiment of the present invention and illustrates an oscillator, dual thin magnetic film transducers and the output circuits.

FIG. 2 is a combination block diagram and circuit schematic illustrating the use of magnetic feedback in the present magnetometer.

FIG. 3 is a pictorial view of a transducer suitable for use in the present invention and is comprised of a plurality of thin magnetic films and their associated substrates arranged in a sandwich-like configuration.

DESCRIPTION OF THE PREFERRED EMBODIMENT

Before proceeding with a description of the drawing, which shows an actual operative embodiment of the magnetometer, it is believed helpful to the reader if both the nature of the thin magnetic films and the transducer action utilized in the present invention and those of the referenced copending applications are reviewed in some detail.

Thin magnetic films have been produced by depositing a nickel-iron alloy on a smooth substrate, such as glass, to a thickness of a few hundred to several thousand angstroms. A number of deposition processes, including evaporation in a vacuum and eletcroplating may be employed. In the evaporative process the deposition of the magnetic material on a glass substrate may be made directly, whereas electroplating on a glass substrate requires the application of a conductive coating on the glass prior to deposition. In general, the characteristics discussed hereinafter apply to films deposited by either of these processes, although in electroplated films consideration must be given to the possible high-frequency eddy-current effects in the required conductive underlayer.

In general, predictable and stable magnetic properties of the films are obtained by choosing an alloy composition which yields minimum magnetostriction coefficient. For the nickel-iron film, the optimum composition appears to be approximately 83% Ni, 17% fe. It has been found experimentally that if the actual composition of the films differs from this ratio by more than a few percent, the film magnetic properties are unduly sensitive to stresses induced by thermal expansion of the substrate or by external forces.

Films of thicknesses up to at least 3,000 angstroms exhibit the capability of existing as a single domain, the magnetization of which can be rotated from a preferred or "easy" direction of magnetization by the application of external fields. This "easy axis" anisotropy is produced in the films by the presence of a large uniform field during the evaporation process which causes the magnetic domains of the alloy to align in a preferred direction.

The magnetic characteristic of thin films in the preferred direction exhibits a substantially rectangular hysteresis loop. In a direction transverse to the easy direction, often referred to as the "hard" direction or axis, the magnetic characteristic is a substantially linear loop. If the film sample under test is continually rotated from the easy to the hard direction, the magnetic characteristic changes from the square loop to the linear loop without interruption. Based upon these characteristics, two magnetic parameters $H_C$ and $H_K$ are obtained. $H_C$ is the coercive field value (coercivity) evaluated from the rectangular hysteresis loop in the easy direction; $H_K$ is the anisotropy field or saturation magnetization force in the hard direction. As distinguished from rotation, magnetic thin films may also exhibit magnetization reversal by domain wall motion in the presence of an easy direction applied field greater than the film coercive force, $H_C$. In the absence of an external magnetic field, single domains can only exist in these films if the size of the film spot is sufficiently large to keep the demagnetizing fields at the edges below the wall-motion threshold of, typically, one to two oersteds.

If a field equal to or larger than $H_K$ is applied in the plane of the film perpendicular to the easy axis it is found that in the absence of an easy direction field, the film magnetization in a given portion of the film is equally likely to return to the easy axis with positive and negative senses; consequently, the magnetization tends to split into multiple domains and the original single-domain state no longer exists until an easy-direction field exceeding $H_C$ is applied.

With reference to FIG. 1, and as taught in said copending application, consider one of the dual transducers, L1. If a winding 12 is placed around a thin magnetic film 10 in such a manner that the coil axis coincides with the hard direction axis of magnetization, the inductance is found to be dependent upon the static magnetic environment represented by field $H_A$ applied to the thin film parallel to its easy axis. The easy axis or preferred direction of the film as well as the direction of the applied fields is indicated by the double-headed arrow 15. When the RF exciting current caused to flow through winding 12 is maintained at a level which limits the perturbation of the film magnetization vector angle to a few degrees, and if the external fields, $H_A$ under observation are confined to values less than the anisotropy field $H_K$ or the coercive force $H_C$, the inductance variation of the transducer is predictable and reversible.

The drawing of the present invention illustrates a pair of thin film transducers L1 and L2, physically arranged so that they have a common sensitive, easy direction axis 15. Means are provided to magnetically bias the thin films 10 and 10' in opposite senses or states of residual flux density. In the drawing such biasing means are pictorially illustrated as two pairs of rod or bar magnets 30, 30', but it should be apparent that other bias means may be satisfactorily employed and the invention is not to be considered limited to the use or illustrated arrangement of such magnets. With the configuration of thin film transducers and magnetic bias means depicted in the drawing, it is observed that the presence of an external magnetic field, $H_A$, applied along the common easy axis of the films causes the inductance of one transducer to increase and the other, to decrease.

Since the two transducers are electrically connected in series and are placed across a constant radio frequency (RF) voltage, $V_T$, the voltages $V_{L1}$ and $V_{L2}$ across the inductances of transducers L1 and L2 respectively will be given by $$V_{L1} = \left(\frac{L1}{L1+L2}\right)V_T$$

$$V_{L2} = \left(\frac{L2}{L1+L2}\right)V_T$$

If the $V_{L1}$ and $V_{L2}$ RF voltages are rectified and the resulting DC voltages are arranged to oppose each other, the output voltage $V_O$ of the magnetometer will be $$V_O = K(V_{L1} - V_{L2}) = KV_T\left(\frac{L1-L2}{L1+L2}\right)$$

where K is an RF to DC conversion factor.

If L1=L2=L0, then $V_O=0$, and if L1 then increases by $\Delta L$ and L2 decreases by $\Delta L$, $$V_O = 2KV_T\left(\frac{\Delta L}{L1+L2}\right) = KV_T\left(\frac{\Delta L}{L0}\right)$$

For small applied magnetic fields $\Delta H$, it is found that $$\frac{\Delta L}{L0} \approx -K_1 \Delta H$$

where $K_1$ is a sensitivity factor determined by the bias, film thickness, film anisotropy field $H_K$, and transducer geometry. Thus, $$V_O = -KK_1V_1 \Delta H$$

This means that the sensor has a DC output which is zero for zero applied field, and which varies directly in amplitude and sign with the applied field.

In the preferred embodiment of the drawing, the constant voltage drive for the thin magnetic film transducers is provided by a Colpitts oscillator. The oscillator resonant circuit comprises the combination of the total inductance of the transducers, and capacitors 13 and 14. Two RF chokes, 24 and 25 are provided to isolate the oscillator from the DC POWER SUPPLY, thereby permitting the grounding of the common center point of hte two transducers. Transistor 20 which is of the NPN conductivity type, operates as a Class C oscillator stage—such oscillators characteristically providing a peak RF resonant tank voltage which is constant and approximately equal to the DC supply voltage, $V_S$.

The output voltage $V_T$ appearing across the oscillator tank circuit is applied to the two thin film transducers L1 and L2 which are indicated pictorially in the drawing. Transducer L1 comprises a thin magnetic film 10, and winding 12 wound thereround. Two rod permanent magnets 30 are illustrated in proximity to the thin magnetic film 10 for applying a magnetic bias thereto in a direction indicated by arrow 16. The lower transducer comprising thin film 10' and winding 12' is similar to the upper transducer. However, the rod magnets 30' which are associated with transducer L2 are reversed in polarity with respect to magnets 30 of transducer L1, with the result that the transducers are biased in opposite senses. The direction of the magnetic bias applied to thin film 12' is indicated by arrow 16'.

Since the voltages $V_{L1}$ and $V_{L2}$ appearing across the respective thin magnetic film transducers are RF signals, some means of rectification is necessary to convert them to the desired DC output. In the drawing, rectification is accomplished by the use of two series-connected cascade voltage doublers, the circuit configuration of which is familiar to those skilled in the electronics art. Other rectifier circuits may be employed with satisfactory results, and the present invention is not to be considered limited to any one of them. A first voltage doubler rectifier operatively connected to receive the voltage $V_{L1}$ of transducer L1 comprises capacitors 17 and 18, diodes 21 and 22, and resistor 23. The DC output voltage $V_1$ appearing across resistor 23 is approximately equal to twice the value of $V_{L1}$. Capacitor 19 serves to establish an AC reference point by bypassing the RF signals directly to ground. Similarly, the second voltage doubler is adapted to receive voltage signal $V_{L2}$ from transducer L2, and comprises capacitors 17', 18', diodes 21', 22', and resistor 23'. The DC voltage across resistor 23' is approximately equal to $2V_{L2}$. The polarities of the diodes used in the rectifier circuits have been arranged to give the desired subtractive effect. Therefore the output of the magnetometer, $V_O$ appearing across terminals 35-35' is applied to the UTILIZATION DEVICE, which in its simplest form may be a galvanometer. $V_O$ is approximately equal to the difference of the voltages appearing respectively across resistors 23 and 23'. Thus $$V_O \approx V_1 - V_2$$

and $$V_O \approx 2V_S \left(\frac{L1-L2}{L1+L2}\right)$$

where $V_S$ is the DC POWER SUPPLY potential.

The peak RF to DC conversion factor would be 2:1 with ideal diodes, but in practice about 0.7 volt is lost in the diode thresholds in each rectifier section. In an actual operative embodiment of the invention, using a $V_S$ of 4 volts, about 3.3 volts was developed across each section.

As noted hereinbefore, the output $V_O$ of the magnetometer varies directly in amplitude and sign with the applied field, $H_A$. Therefore, summarizing the various conditions of applied field, where the arrow is indicative of direction of the field:

$H_A = 0$; $V_{L1} = V_{L2}$; $V_O = 0$ $H_A \rightarrow$; $V_{L2} > V_{L1}$; $V_O$ is negative $H_A \leftarrow$; $V_{L1} > V_{L2}$; $V_O$ is positive As is apparent from the drawing, the output voltage $V_O$ is not internally referenced to any particular level. The dotted jumper connection from terminal 35' indicates a possible ground reference. This feature allows greater versatility in those circumstances where the sensor output voltage is to be modified by additional circuits, such as amplifiers, prior to being applied to the utilization device.

The sensitivity of the basic magnetometer, may be increased by the use of a plurality of thin magnetic films and substrates per transducer, or by the use of thicker films. For example, as many as six magnetic films, each having a thickness of 2500 A., have been used in each of the dual transducers to fulfill the higher sensitivity requirement of specialized applications. FIG. 3 depicts a transducer comprised of three thin magnetic films 10a, 10b, 10c and their respective substrates 11a, 11b and 11c. In the present device the multiple films create no tuned-circuit stability problem since any drift with temperature or aging tends to cancel between the two transducers.

Another characteristic of the present invention, is that any nonlinearity of the transducer inductance versus field relationship is substantially cancelled by the action of the dual transducers, thereby resulting in a more accurate and stable device. As a practical matter, it has been observed that the transducer incremental sensitivity $(dL/dH)$ decreases with the application of a field which aids the magnetic bias, and increases with a field which opposes the bias. If the magnitude of the change in sensitivity was independent of the applied field sense, the increase in sensitivity of one transducer in the dual configuration would exactly cancel the decrease in sensitivity of the other, and the output sensitivity would remain constant. However, it has been found that a magnetic field applied to a first transducer in a direction opposed to the magnetic bias, increases the sensitivity of the first transducer to a greater extent, than the same field applied to the second transducer in a direction aiding the magnetic bias, decreases the sensitivity of the second transducer. That is, the output sensitivity of the device tends to increase slightly as the applied field, $H_A$, becomes larger, independently of the sense of the field. It must be emphasized, however that this effect is considered inconsequential for most applications, and by way of comparison, represents about a 5:1 improvement in the analogous effect inherent in the magnetometer sensor described in the referenced application Ser. No. 543,097.

A similar effect occurs in the present device with respect to transducer response to magnetic fields or components thereof applied to the transducers along the hard direction axis of the thin magnetic films. This effect is even more minimal than that described previously, and extensive testing has revealed that the present device exhibits substantially uniaxial sensitivity.

As mentioned hereinbefore, a very important aspect of the voltage mode of operation of the present device is its complete freedom from drift due to oscillator frequency variation. Although it is desirable to utilize radio frequency signals in the order of 10-20 mHz. in order to develop operating voltages across the transducers at reasonable current levels, the actual frequency of the signal is unimportant. A review of the equations presented hereinbefore relating magnetometer output voltage to applied fields reveals that the equations contain no terms involving frequency. For the sake of technical accuracy, it may be mentioned that the only frequency variation which occurs with applied field is that due to the slight increase in total inductance with applied fields, because of the greater individual inductance change with a field opposing the transducer magnetic bias. This frequency variation is small and inconsequential.

The determination of the circuit constants of the configuration illustrated in the drawing is well within the skill of the electronic circuit designer who will choose them in accordance with the particular application of the device. In an actual operative embodiment, the circuit constants chosen yielded an oscillator frequency of 14 mHz. Obviously, the transducer inductance values will determine an optimum operating frequency. The total DC current drain for the circuit shown in the drawing is about 235 microamperes from a 4-volt power supply.

Finally, while random current changes are known to be present in the outputs of all oscillators, such changes appear to be eliminated at the output of the present magnetometer, due to the cancelling action of the transducers which carry the same RF current. Thus even at very low levels of applied magnetic field, the output is essentially free of oscillator noise.

In the referenced application, Ser. No. 543,097 it was observed that the use of feedback techniques provide stable magnetometer performance with noncritical component and supply requirements. The use of a magnetic feedback loop in the present magnetometer yields nearly perfect linearity. FIG. 2 illustrates how a correction-field generating solenoid 40 may be employed with the configuration of FIG. 1. In this case, the output $V_O$ of the magnetometer sensor appearing across terminals 35-35' is applied to an AMPLIFIER, which in effect takes the place of the UTILIZATION DEVICE. The AMPLIFIER should be of a type suitable for feedback systems and should provide large, open-loop gain. Such amplifiers are well known to electronic circuit designers. Solenoid 40 is positioned about the biased transducers L1 and L2 in such a manner that current flow through the solenoid generates a feedback field $H_F$ along the common easy axes 15 of the transducer thin films. The amplifier is designed to produce zero current through solenoid 40 when $V_O$ is zero, and to cause current flow through solenoid 40 of a magnitude and polarity to produce a field $H_F$ which is precisely equal and opposite to $H_A$, the field present in the external environment. Under these feedback conditions, a virtually zero environmental field condition is maintained at the transducers. The amplitude of the current in the solenoid 40 is then substantially directly proportional to the environmental field $H_A$. The voltage drop across resistor 41 as a result of the current flow through solenoid 40 is substantially linear. The output $V_{O'}$ of the magnetometer is then available at terminal 45-45'.

It will be apparent from the foregoing description of the invention and its mode of operation that there is provided an improved magnetometer system which utilizes dual thin magnetic film transducers.

I claim:

1. In a magnetometer, a pair of transducers comprised of ferromagnetic materials capable of assuming opposed states of residual flux density along common preferred axes of magnetization, means for applying magnetic bias fields of opposite polarities respectively to said ferromagnetic materials whereby said materials are magnetized substantially in predetermined opposite ones of said states, winding means inductively coupled to said materials and being so disposed therewith as to link the magnetic flux of said materials in a direction transverse to said preferred axis, a source of alternating current, said winding means being adapted to be energized from said source of alternating current which is controlled in amplitude such that the magnetization of said materials is disturbed but not permanently altered in state, the respective inductance values of said pair of transducers being dependent upon the instantaneous external magnetic field environment to which said transducers are concurrently subjected, the alternating current voltages developed across said winding means by said source of alternating current being of the same frequency as said source and varying directly as a function of said respective inductance values.

2. In a magnetometer as defined in claim 1, said transducers being further characterized in that said ferromagnetic materials are thin films of nickel-iron alloy each having a thickness of not more than 5000 angstrom units.

3. In a magnetometer, dual transducers comprised of magnetic films capable of assuming opposed states of residual flux density along common easy axes of magnetization, bias means positioned in proximity to said magnetic films for magnetizing said films in predetermined opposite ones of said states, said films existing as substantially single domains of said predetermined states, a pair of coils associated respectively with said transducers and wound about said films in such a manner that the coil axes are parallel to the hard axes of magnetization of the films, a controlled source of alternating current, said coils being adapted to be energized from said controlled source of alternating current whereby the magnetization of said films is disturbed but said single domain configurations remain substantially unaltered, the respective inductance values of said dual transducers varying substantially inversely with respect to each other in response to a magnetic field component applied concurrently to said transducers in a direction substantially parallel to said easy axes of said magnetic films, the alternating current voltages developed across said coils by said source of alternating current being of the same frequency as said source and varying directly as a function of said respective inductance values.

4. In a magnetometer as defined in claim 3 said bias means comprising a plurality of permanent magnets, physically oriented to apply bias magnetic fields of opposite polarities to the respective transducers.

5. In a magnetometer of the character defined by claim 3, further including means for comparing said alternating current voltages developed across said coils and for deriving from the comparison an output signal indicative of said magnetic field component applied concurrently to said transducers.

6. A magnetometer comprising a pair of ferromagnetic thin film devices capable of assuming opposed states of residual flux density along a common easy direction of magnetization, magnetic bias means for magnetizing said thin film devices to respective opposite states of residual flux density, said devices existing as substantially single domains of the respective states, a pair of inductor windings disposed respectively about said devices in such a manner as to link the thin film magnetic flux in the hard direction of magnetization, said inductor windings being electrically connected in series relationship and having their common point returned to a reference potential, a source of radio frequency current, said windings being adapted to be energized from said source of radio frequency current controlled in amplitude so as to limit the perturbation of the magnetization of said devices to small angular rotations incapable of altering said single domain configurations, each of said thin film devices and its associated inductor winding comprising an inductance having a value dependent upon the external magnetic field environment to which said devices are concurrently subjected along said easy direction of magnetization, the inductance values of the pair of thin film device and inductor winding combinations varying substantially inversely with respect to each other in response to said external field environment, the radio frequency voltages developed respectively across the inductor windings by said radio frequency source being of the same frequency as said source and varying directly as a function of said inductance values of said combinations, and rectifier means operatively connected to said inductor windings for converting said radio frequency voltages developed thereacross to a direct current signal having a polarity and amplitude indicative respectively of the direction and field strength of said external field environment.

7. A magnetometer as defined in claim 6 further including capacitive means connected in parallel with said inductor windings and forming therewith a resonant circuit for said source of radio frequency current.

8. A magnetometer as defined in claim 6 further characterized in that each of said thin film devices comprises a thin magnetic film element of a nickel-iron alloy composed substantially of 83% nickel and 17% iron, and having a thickness of approximately 2500 angstrom units.

9. A magnetometer as defined in claim 6 further characterized in that each of said thin film devices comprises a plurality of thin magnetic film elements, each being formed of a nickel-iron alloy composed substantially of 83% nickel and 17% iron, and each having a thickness of approximately 2500 angstrom units.

10. A magnetometer as defined in claim 6 further characterized in that said magnetic bias means comprise a pair of rod-type permanent magnets positioned in proximity to each of said thin film devices, said magnets being physically oriented with respect to said devices such that the bias fields supplied thereby are of sufficient magnitude and proper polarity to magnetize said thin film devices to respective opposite states of residual flux density.

11. A magnetometer as defined in claim 6 further characterized in that said source of radio frequency current comprises a transistor connected in a Colpitts oscillator circuit.

12. A magnetometer as defined in claim 6 wherein said rectifier means comprise a pair of cascade voltage doublers operatively connected to respective ones of said inductor windings, each of said cascade voltage doublers comprising first and second capacitors, a pair of diodes and a resistor, said pair of diodes being connected in series and being poled in the same direction, said first capacitor being connected between one of said inductor windings and the common point of said series diodes, said second capacitor and said resistor being connected in parallel with each other with the combination of said series diodes, said pair of voltage doublers being referenced to a common AC ground potential and being interconnected such that the DC voltages developed across the respective voltage doubler resistors are subtractive, said direct current signal representing the difference of said last mentioned DC voltages, and means for utilizing said signal.

13. A magnetometer as defined in claim 6 further including feedback means comprising a correction-field generating solenoid positioned in close proximity to said thin film devices and having its coil axis oriented parallel to said easy axes of magnetization of said devices, amplifier means operatively connected to said rectifier means for receiving said direct current signal developed thereby, the output signal of said amplifier means being applied to said solenoid for causing current flow therethrough, said solenoid generating a feedback magnetic field applied to said devices along said easy direction of magnetization and opposed in field strength and direction to the magnetic field present in said external environment, a resistor connected in series with said solenoid, the amplitude and polarity of the voltage developed across said resistor as a result of the current flow through said solenoid being a substantially linear function of the respective field strength and direction of said external magnetic field environment.

References Cited

UNITED STATES PATENTS

| | | | |
|---|---|---|---|
| 3,239,754 | 3/1966 | Odom et al. | 324—47 |
| 3,311,821 | 3/1967 | Brunel | 324—43 |

OTHER REFERENCES

R. G. Rowe: "Magnetostriction Compass," Electronics, July, 1945, pp. 123–125.

E. P. Felch et al.: "Airborne Magnetometers," Elec. Eng., July, 1947, pp. 680–685.

F. E. Terman: "Electronic and Radio Engineering," McGraw-Hill, 1955, p. 708.

ALFRED E. SMITH, Primary Examiner

U.S. Cl. X.R.

324—47